US011423103B2

(12) United States Patent
Cox et al.

(10) Patent No.: US 11,423,103 B2
(45) Date of Patent: Aug. 23, 2022

(54) CONTENT-ITEM RECOMMENDATIONS

(71) Applicant: Valve Corporation, Bellevue, WA (US)

(72) Inventors: Anthony John Cox, Seattle, WA (US); Christian Carollo, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 369 days.

(21) Appl. No.: 16/505,112

(22) Filed: Jul. 8, 2019

(65) Prior Publication Data

US 2021/0011958 A1    Jan. 14, 2021

(51) Int. Cl.
| | |
|---|---|
| *G06F 16/9535* | (2019.01) |
| *G06N 20/00* | (2019.01) |
| *A63F 13/79* | (2014.01) |
| *G06F 16/9536* | (2019.01) |
| *G06F 16/9035* | (2019.01) |

(52) U.S. Cl.
CPC .......... *G06F 16/9535* (2019.01); *A63F 13/79* (2014.09); *G06F 16/9035* (2019.01); *G06F 16/9536* (2019.01); *G06N 20/00* (2019.01)

(58) Field of Classification Search
CPC ........................ G06F 16/9535; G06Q 30/0255
See application file for complete search history.

(56) References Cited

U.S. PATENT DOCUMENTS

| | | |
|---|---|---|
| 9,762,629 B1 | 9/2017 | Bhargava et al. |
| 2005/0089835 A1 | 4/2005 | Soldavini et al. |
| 2005/0261062 A1* | 11/2005 | Lewin ................... A63F 13/358 463/42 |
| 2006/0282304 A1* | 12/2006 | Bedard .............. G06Q 30/0201 705/7.33 |
| 2007/0244742 A1* | 10/2007 | Short ................. G06Q 30/0201 705/7.28 |
| 2011/0054980 A1* | 3/2011 | Simons .................. G06Q 30/02 705/7.37 |

(Continued)

OTHER PUBLICATIONS

Gong, Jin, Yizhou Ye, and Kostas Stefanidis. "A Hybrid Recommender System for Steam Games." Information Search, Integration, and Personalization: 13th International Workshop, ISIP 2019, Heraklion, Greece, May 9-10, 2019, Revised Selected Papers. Springer, 2020. (Year: 2020).*

(Continued)

*Primary Examiner* — William Spieler
(74) *Attorney, Agent, or Firm* — Lee & Hayes, P.C.

(57) ABSTRACT

Described herein are, among other things, techniques, devices, and systems for generating one or more trained machine-learning models used for generating content-item recommendations. Also described herein are techniques, devices, and systems for applying a consumption history of a particular user to the trained model(s) to generate score data indicating a correlation between each content-item title and the consumption history, as well as modifying this score data using one or more biasing factors for generating result data. In addition, the techniques, devices, and systems may use this result data, along with received user input, for determining an order in which to present one or more content items to the user. For example, this may include determining which content items to recommend to a user and in which order to do so.

20 Claims, 8 Drawing Sheets

(56) References Cited

U.S. PATENT DOCUMENTS

| | | | |
|---|---|---|---|
| 2011/0302103 | A1 | 12/2011 | Carmel et al. |
| 2012/0023095 | A1* | 1/2012 | Wadycki ............ G06F 16/24578 707/723 |
| 2012/0060077 | A1 | 3/2012 | Mate et al. |
| 2013/0080224 | A1* | 3/2013 | O'Brien ................. G06Q 10/10 705/14.14 |
| 2014/0179439 | A1 | 6/2014 | Miura et al. |
| 2015/0099589 | A1 | 4/2015 | Smith |
| 2015/0269810 | A1* | 9/2015 | Wolf ................... G07F 17/3225 463/25 |
| 2015/0365729 | A1 | 12/2015 | Kaya et al. |
| 2016/0256775 | A1 | 9/2016 | Gustafson et al. |
| 2018/0063276 | A1 | 3/2018 | Foged |
| 2018/0130075 | A1 | 5/2018 | Roy |
| 2018/0150894 | A1 | 5/2018 | Srivastava et al. |
| 2021/0011939 | A1 | 1/2021 | Sardar et al. |

OTHER PUBLICATIONS

Gabmeier, Jorg. "Recommender Systems in the Domain of Video Games." 2016. Graz University of Technology, Master's Thesis. (Year: 2016).*

Anwar, Syed Muhammad, et al. "A game recommender system using collaborative filtering (GAMBIT)." 2017 14th International Bhurban Conference on Applied Sciences and Technology (IBCAST). IEEE, 2017. (Year: 2017).*

Bertens, Paul, et al. "A machine-learning item recommendation system for video games." 2018 IEEE Conference on Computational Intelligence and Games (CIG). IEEE, 2018. (Year: 2018).*

Choi, Brian; Ryu, MiSun; Panchai, Dharmesh; Le, Andrew (2019). Building Recommender Systems for Video Games on Steam. In Data Science & Engineering Master of Advanced Study (DSE MAS) Capstone Projects. UC San Diego Library Digital Collections. https://doi.org/10.6075/J0FQ9TZM (Year: 2019).*

Notten, Bram. "Improving Performance for the Steam Recommender System using Achievement Data." 2017. Tilburg University, Master's Thesis (Year: 2017).*

Kang, Wang-Cheng, and Julian McAuley. "Self-attentive sequential recommendation." 2018 IEEE International Conference on Data Mining (ICDM). IEEE, 2018. (Year: 2018).*

Politowski, Cristiano, et al. "Learning from the past: A process recommendation system for video game projects using postmortems experiences." Information and Software Technology 100 (2018): 103-118. (Year: 2018).*

Ben-Porat, Omer, and Moshe Tennenholtz. "A game-theoretic approach to recommendation systems with strategic content providers." arXiv preprint arXiv: 1806.00955 (2018). (Year: 2018).*

Wan, Mengting, and Julian McAuley. "Item recommendation on monotonic behavior chains." Proceedings of the 12th ACM conference on recommender systems. 2018. (Year: 2018).*

Pathak, Apurva, Kshitiz Gupta, and Julian McAuley. "Generating and personalizing bundle recommendations on steam." Proceedings of the 40th International ACM SIGIR Conference on Research and Development in Information Retrieval. 2017. (Year: 2017).*

Hruska, "Valve Introduces Machine Learning Algorithm to Recommend New Steam Games", retrieved on Sep. 30, 2020 at «https://www.extremetech.com/gaming/294859-valve-introduces-machine-learning-algorithm-to-recommend-new-steam-games», Jul. 12, 2019, 6 pages.

The PCT Search Report and Written Opinion dated Oct. 13, 2020 for PCT Application No. PCT/US2020/039885, 13 pages.

Trneny, "Machine Learning for Predicting Success of Video Games", retrieved on Sep. 30, 2020 at «https://is.muni.cz/th/396121/fi_m/diploma_thesis_trneny.pdf», Dec. 31, 2017, 68 pages.

Breese, et al., "Empirical Analysis of Predictive Algorithms for Collaborative Filtering", arXiv: 1301.7363. Jan. 30, 2013, Retrieved on Aug. 19, 2020 from «https://arxiv.org/ftp/arxiv/papers/1301/1301.7363.pdf».

The PCT Invitation to Pay Additional Fees, dated Aug. 13, 2020, for PCT Application No. PCT/US2020/039885, 2 pages.

The PCT Search Report and Written Opinion dated Sep. 3, 2020 for PCT application No. PCT/US20/39925, 9 pages.

Gong, et al., "A Hybrid Recommender System for Steam Games", Information Search, Integration, and Personalization: 13th International Workshop, ISIP 2019, Heraklion, Greece, May 2019, Revised Selected Papers, Springer, 2020, 24 pgs.

Office Action for U.S. Appl. No. 16/505,112, dated Jul. 28, 2021, Cox, "Content-Item Recommendations", 13 pages.

The International Preliminary Report on Patentability for PCT Application No. PCT/US20/39925, dated Jan. 20, 2022; 8 pages.

* cited by examiner

CONTENT-ITEM RECOMMENDATIONS

BACKGROUND

As the consumption of content items on electronic devices has continued to proliferate, so has the amount of available content items. For example, the number of songs, movies, television shows, and games available for streaming or download has increased substantially in the recent past. While this increase in available content items is generally beneficial to users, identifying content items of interest for individual users remains difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
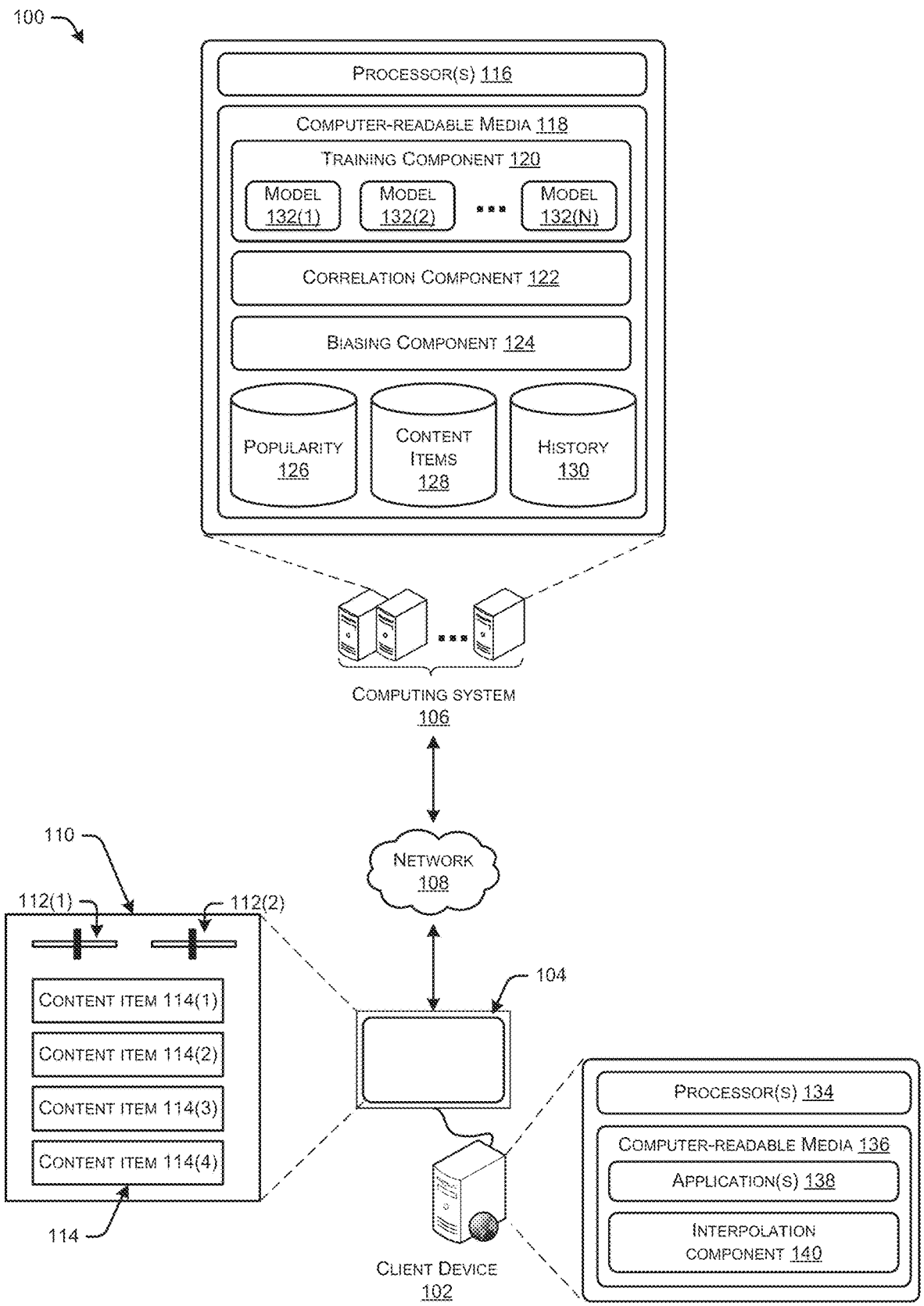
FIG. 1 is a diagram illustrating an example environment that includes a remote computing system configured to train and use machine-learning model(s) for recommending content items to different users. In some instances, the remote computing system trains multiple models and, thereafter, inputs a consumption history of a user into each of the models for generating score data indicating a correlation between each of multiple content-item titles and the consumption history. Further, the computing system may use one or more biasing factors to generate result data, which the computing system may send to a client device of a user. The client device may use this result data, as well as different user inputs, to determine order(s) in which to present content-item recommendations to the user.

Described herein are, among other things, techniques, devices, and systems for generating one or more trained machine-learning models used for generating content-item recommendations. Also described herein are techniques, devices, and systems for applying a consumption history of a particular user to the trained model(s) to generate score data indicating a correlation between each content-item title and the consumption history, as well as modifying this score data using one or more biasing factors for generating result data. In addition, the techniques, devices, and systems may use this result data, along with received user input, for determining an order in which to present one or more content items to the user. For example, this may include determining which content items to recommend to a user and in which order to do so.

The disclosed techniques may be implemented, at least in part, by a remote computing system that distributes content items (e.g., video games, movies, television shows, songs, etc.) to client devices of a user community (e.g., as part of a video game service, movie service, song service, etc.). These client devices may individually install a client application that is configured to execute the content items received (e.g., downloaded, streamed, etc.) from the remote computing system. In the example of a video game services, the video-game platform enables registered users of the community to play video games as "players." For example, a user can load the client application, login with a registered user account, select a desired video game, and execute the video game on his/her client machine via the client application. Of course, while some examples are described with reference to video-game titles, it is to be appreciated that the described techniques apply to any other type content item, as described above.

In one example, the computing system, which is typically remote from client devices of individual users, generates multiple trained models, each associated with a particular value of a parameter. For example, the computing system may generate a first trained model for use in recommending content items that have been released within a first time window (e.g., the prior six months), a second trained model for use in recommending content items that have been released in a second time window (e.g., the prior year), and so forth. As will be described below, these models may applying to individual user data for generating tailored content-item recommendations.

While the computing system may train these models in any suitable manner, in one example the computing system begins by accessing respective consumption histories (e.g., gameplay histories, moving histories, etc.) of multiple users associated with the computing-system community. For example, the computing system may access a gameplay history of a first user of a video-game-service community and may use this history for training the first model. For example, if the first model is for use in recommending game titles that have been released within the past six months, the computing system may select, from the gameplay history of the user, one game title that has been released within the past six months and may indicate to the first model that this selected game title is to be the output of the classifier. Thereafter, the computing system may provide the entire gameplay history of the user as input to the first model and the selected game title as output of the first model for training one or more internal layers of the first model. For instance, if the first model comprises an artificial neural network, then selecting the game title as output and providing information regarding the gameplay history of the user as input may be effective to train one or more internal layers of the neural network. It is to be appreciated that the input and output of the neural network, and other types of models that may be used, may comprise features of the corresponding game titles or other content items, such as release data, genre, game-type, and/or the like. In addition, the input to the models may include information associated with the user, such as a geographical location associated with the user, demographic information associated with the user, and/or the like. In addition, while a few example inputs to the models have been described, it is to be appreciated that any other type of input may be provided to the models.

In some instances, the computing system may take into account the amount of time that the user has played each game in her history in selecting the game title to be used as output for the machine-learning model. For example, the computing system may initially determine an amount of time that the user has played each individual game title referenced in the gameplay history of the user. This may be determined either absolutely (e.g., in terms of time played) or relatively (e.g., in terms of time played relative to other users that have also played the game title). This information may be applied as a weight to the individual game title or may be passed into the model as an input. After applying a weight to each game title associated with the gameplay history or inputting this information to the models (after, potentially, filtering out some game titles due to a very small amount of gameplay by the user), the computing system may then select one (or more) game title to be used as output by the first model. By doing so, the computing system increases the chances that the games played the most by the user are selected as the output of the first model, thus training the internal layer(s) of the first model in a way that results in the model being more likely to select games of interest to the user. It is to be appreciated, however, that while the above description illustrates one manner in which to train the models, other models for outputting content-item recommendations may be trained in any other number of ways.

In addition to training a first model, in some instances the computing device may also train multiple other models, such as a model for recommending games released within the last year, a model for recommending games released within the last three years, and so forth. In each instance, the computing system may access a gameplay history of a user and select, as the output to the particular model, a game title that is both indicated in the gameplay history and that was released within the amount of time associated with the particular model (e.g., within one year, three years, etc.). Furthermore, while the above example describes accessing a single gameplay history for training each of the multiple machine-learning models, it is to be appreciated that the computing system may analyze thousands or more of the gameplay histories for training the models.

After training the machine-learning models, the computing system may then use the models for generating data that may be used by client devices for surfacing content-item (e.g., video game) recommendations. For example, envision that a particular user sends a request, via a client device, for video-game recommendations. Upon receiving the request, the computing system may identify the user (e.g., via a device or user identifier) and may access a gameplay history of the user. The computing system may then input the gameplay history into each of the multiple machine-learning models along with information regarding available games associated with each model. For example, for the first trained model (which has been trained to more heavily weight games released within the last six months), the computing system may input the gameplay history of the user and information regarding games available to be recommended, for the second trained model (which has been trained to more heavily weight games released within the last year), the computing system may input the gameplay history of the user and information regarding those games available to be recommended, and so forth. That is, while the entire catalog of available games may be input to the first model, the second model, and so forth, the first model may be more likely to recommend games having been released within the last six months, the second model may be more likely to recommend games that have been released within the last year, and so forth.

Each trained machine-learning model may output score data that indicates, for each of multiple game titles, a correlation between the gameplay history of the user and the particular game title. As the reader will appreciate, those games that are highly correlated to the gameplay history will have a relatively high score, and vice versa. Further, if the computing system implements "N" number of models, then the computing system may generate "N" number of score data. It is also to be appreciated that the "correlation" might not be a statistical correlation, but rather simply a representation of a likelihood that a user with the same gameplay history of the subject user would choose to play this game.

In addition, the computing system may be configured to bias the score data based on different values of one or more biasing factors. The biasing factors may comprise any number of factors, such as a popularity of each game, a cost of each game, a genre of each game, or the like. In one example, the biasing factor may comprise a popularity of each game, as determined by sales of the game, an amount of gameplay of the game, and/or the like. In some instances, each score data (determined by an individual trained model) may be biased at different levels of popularity such that the resulting biased data will more closely match that particular level of popularity if so desired by the user. That is, the computing system may bias the score for each game title (and for each model) at a number of "M" target levels of popularity ranging from very popular to very unpopular (or very "niche"). As the reader will appreciate, the computed scores of those game titles that are very popular will be boosted for a target level of popularity of "very high" and will be penalized for a target level of popularity of "very low". Conversely, the computed scores of more niche game titles will be penalized for a target level of popularity of "very high" and will be boosted for a target level of popularity of "very low".

Finally, given that the computing system has now computed, for a particular user, score data for each of "N" number of trained models, and has biased each of these scores using "M" number of popularity values, then computing system may now have generated an amount of scores for the user in an amount of "M×N". For example, if the computing system utilizes six models and five levels of popularity, then the computing system will have generated a total of thirty scores for any particular user (given that each of the six score data generated by the model will biased five times). Of course, it is to be appreciated that the computed score data may have any other number of values and may be sampled in any other (e.g., nonlinear) manner. Further, while this example describes inputting values of a first parameter prior to training the model (in this case, based on release date) and values of a second after the training (in this case, based on popularity), any other number of parameters may be applied as input to the model and/or as part of the postprocessing described with reference to the popularity data. It is also noted that while the postprocessing parameters are described as biasing factors, these biasing factor(s) represent parameter(s) that may be applied as inputs to the models or as part of postprocessing.

Upon computing this score data, in the form of a matrix or otherwise, the computing system may then send this "result data" to the client device of the user. The client device of the user may then use this result data, as well as input from the user, for determining an order in which to present one or more of the game titles available to the user. That is, the client device may use the result data and input data from the user for determining which video games to recommend to the user, and how to change this recommendation as the user provides different input data.

To continue the example from above, the client device may enable the user to provide, as input, a selection of a desired release recency and a selection of a desired level of popularity. That is, the user may indicate, to the client device, whether the user prefers to see, as game recommendations, games that have been more recently released or games that are older. In addition, the user may specify whether she would like to receive recommendations for games that are in the mainstream (that is, popular), or games that are more niche (that is, less popular). While the examples below illustrate and describe the user as providing this input via one or more sliders, it is to be appreciated that this input may be provided in any other manner.

Upon receiving an input from a user, such as input indicating that the user would like to see recommendations for games that are generally newer and more niche, the client device may use the result data to determine which games to recommend to the user and in which order. In some instances, the client device may identify, from the input, which one or more of the computed score data that the client device has received for the user is closest to the input data of the user. For instance, in the example of the user specifying relatively new games that are less popular, the client device may identify which of the scores from the computed scored data correspond to: (1) the model(s) that have been trained for this time range, and (2) the scores that have been biased to boost less popular titles. After identifying these scores, the client device may use interpolation for determining scores associated with individual games and may then present the game recommendations to the user based on these scores. For example, the client device may utilize bilinear interpolation or any other form of interpolation to compute scores for the game titles and may sort these game titles according to the computed scores, with those game titles having highest scores being placed at the top of the list. Further, if the user provides different input data—such as by moving one or both sliders described above—the client device may again identify the most pertinent score data from the matrix or other representation of scores and may interpolate this score data for re-ranking the game titles.

By generating this score data at the remote computing system and performing the interpolation locally at the client device, the described techniques greatly improve the fluidity of the process for ranking and re-ranking content-item recommendations at the client device. That is, because the techniques involve sending multiple score data to the client device rather than a single result, and because the client device is configured to perform real-time interpolation of these score data in response to receiving different user input, the techniques enable the ranking and re-ranking of recommendations without requiring additional roundtrip requests to the remote computing system. Stated otherwise, the techniques enable unlimited reranking of content-item recommendations at the cost of a single request to and response from the remote computing system, as opposed to a requirement of making a call to the system and awaiting a response from the system each time the user provides different input.

In addition, the techniques described herein provide for a very fine-grain level of content recommendation. By enabling a user to specify a desired value of a first parameter (e.g., cost, release date, etc.) and a desired value of a second parameter (e.g., popularity, cost, etc.), and by performing client-side interpolation of these inputs, the techniques provide highly-tailored content-item recommendations.

It is to be appreciated that while some of the techniques are described herein with reference to two parameters (release data and popularity), the techniques may be used for any other number of parameters (e.g., one, five, etc.) and for any other parameter values (e.g., cost, genre, etc.). It is also to be appreciated that while the recommendations are described as being presented on one or more UIs, the recommendations may be output in any other manner (e.g., audibly, visually, etc.).

FIG. 1 is a diagram illustrating an example environment that includes a client device 102, associated with a display 104, and a remote computing system 106 configured to train and use machine-learning model(s) for recommending content items to different users. In some instances, and as described in further detail below, the remote computing system 106 trains multiple models and, thereafter, inputs a consumption history of a user into each of the models for generating score data indicating a correlation between each of multiple content-item titles and the consumption history. Further, the computing system 106 may use one or more biasing factors to generate result data, which the computing system may send to the client device 102 of a user. The client device 102 may use this result data, as well as different user inputs, to determine order(s) in which to present content-item recommendations to the user, on the display 104 or otherwise.

The client device 102 may be implemented as any suitable type of computing device configured to execute content items, such as video games, movies, songs, and/or the like. The client device 102 may comprise, without limitation, a personal computer (PC), a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, a music player, a voice-controlled assistant, and/or any similar computing device. The client device 102 may communicate with the remote computing system 106 (sometimes shortened herein to "computing system 106") over a computer network 108. The computer network 108 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The computing system 106 may, in some instances be part of a network-accessible computing platform that is maintained and accessible via the computer network 108. Network-accessible computing platforms such as this may be referred to using terms such as "on-demand computing", "software as a service (SaaS)", "platform computing", "network-accessible platform", "cloud services", "data centers", and so forth.

In some embodiments, the computing system 106 acts as, or has access to, a video game platform that implements a video game service to distribute (e.g., download, stream, etc.) video games (or any other type of content item) to the client device 102. In an example, the client device 102 may each install a client application thereon. The installed client application may be a video-game client (e.g., gaming software to play video games). A client device 102 with an installed client application may be configured to download, stream, or otherwise receive programs (e.g., video games, and content thereof) from the computing system 106 over the computer network 108. Any type of content-distribution model can be utilized for this purpose, such as a direct purchase model where programs (e.g., video games) are individually purchasable for download and execution on a client device 102, a subscription-based model, a content-distribution model where programs are rented or leased for a period of time, streamed, or otherwise made available to the client devices 102. Accordingly, an individual client device 102 may include one or more installed video games that are executable by loading the client application.

The client device 102 may be used to register with, and thereafter login to, a video game service. A user may create a user account for this purpose and specify/set credentials (e.g., passwords, PINs, biometric IDs, etc.) tied to the registered user account. As a plurality of users interact with the video game platform (e.g., by accessing their user/player profiles with a registered user account, playing video games on their respective client devices 102, etc.), the client devices 102 send data to the remote computing system 106. The data sent to the remote computing system 106, for a given client machine 104, may include, without limitation, user input data, video game data (e.g., game performance statistics uploaded to the remote system), social networking messages and related activity, identifiers (IDs) of the video games played on the client device 102, and so on. This data can be streamed in real-time (or substantially real-time), sent the remote system 106 at defined intervals, and/or uploaded in response to events (e.g., exiting a video game). As described in further detail below, this data may be used to determine a gameplay history of the user of the client device 102, which may be used for determining scores for recommending game titles to the user.

FIG. 1, for example, illustrates that the client device 102 may present, on the display 104, a UI 110 for recommending one or more content items (e.g., video games) to the user of the client device 102. In this example, the UI 110 includes one or more UI controls 112(1) and 112(2) for providing two different user inputs. For example, the first UI control 112(1) may enable a user of the client device 102 to provide a desired value of a first parameter, while the second UI control 112(2) may enable the user to provide a desired value of a second parameter. The client device may then use these values for generating a custom list 114 of recommended content items 114(1), 114(2), 114(3), and 114(4). As described and illustrated in further detail below, the first UI control 112(1) may enable the user to specify a desired level of popularity, while the second UI control 112(2) may enable the user to specify a desired level of release-date recency of the content items. Further, and also as discussed below, the client device 102 may update the list 114 of recommended content items in response to the user provides input via the UI control(s) and without interacting with the computing system 106.

FIG. 1 further illustrates that the computing system 106 may include one or more processors 116 (e.g., central processing unit(s) (CPU(s)) and computer-readable media 118. The computer-readable media 118 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 118 may be implemented as computer-readable storage media ("CRSM"), which may be any available physical media accessible by the processor(s) 116 to execute instructions stored on the computer-readable media 118. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 116.

As illustrated, the computer-readable media 118 may store or otherwise have access to a training component 120, a correlation component 122, and a biasing component 124. In addition, the media 118 may store popularity data 126 indicating popularity (e.g., sales, gameplay time, etc.) of respective content items, content items 128 available for acquisition at the client device, and history data 130 indicating respective consumption histories of different users.

The training component 120 may use the history data 130 to train one or more machine-learning models 132(1), 132(2), ..., 132(N). For example, the training component 120 may train each of multiple machine learning models using a portion of the history data 130 that is associated with a sampled set of user accounts as training data to obtain trained machine-learning models 132(1)-(N).

The trained machine-learning model(s) 132 may represent a single model or an ensemble of base-level machine-learning models, and may be implemented as any type of machine-learning model 132. For example, suitable machine-learning models 132 for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine-learning models 132 whose outputs (predictions) are combined, such as by using weighted averaging or voting. The individual machine-learning models of an ensemble can differ in their expertise, and the ensemble can operate as a committee of individual machine-learning models that is collectively "smarter" than any individual machine-learning model of the ensemble.

The training data that is used to train each machine-learning model 132 may include various types of data. In general, training data for machine learning can include two components: features and labels. However, the training data used to train the machine-learning model(s) 132 may be unlabeled, in some embodiments. Accordingly, the machine-learning model(s) 216 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. The following is a list of example features that can be included in the training data for training the machine learning model(s) 132 described herein. However, it is to be appreciated that the following list of features is non-exhaustive, and features used in training may include additional features not described herein, and, in some cases, some, but not all, of the features listed herein. Example features included in the training data may include, without limitation, a release date a content item, a genre of a content item, a title of a content item, a length of a content item, a rating of a content item, users that have consumed the content item, and/or the like. Further, as part of the training process, the training component 120 may set weights for machine learning. These weights may apply to a set of features included in the training data, as derived from the historical data 130. In some embodiments, the weights that are set during the training process may apply to parameters that are internal to the machine-learning model(s) (e.g., weights for neurons in a hidden-layer of a neural network). These internal parameters of the machine-learning model(s) may or may not map one-to-one with individual input features of the set of features. The weights can indicate the influence that any given feature or parameter has on the score that is output by the trained machine learning model 132.

In some instances, the training component 120 may train individual models by accessing individual consumption histories of users, selecting a particular content item indicated by the respective history as the output of the model, inputting the consumption history as input to the model, and training one or more internal layers of the model. For example, and as described above, the training component may access a consumption history of a first user and may use this history for training the first model 132(1). For example, if the first model 132(1) is for use in recommending content-item titles that have been released within the past six months, the training component 120 may select, from the history of the user, one game title that has been released within the past six months and may indicate to the first model 132(1) that this selected title is to be the output of the model. Thereafter, the training component 120 may provide the entire consumption history of the user as input to the first model 132(1) and the selected content-item title as output of the first model 132(1) for training one or more internal layers of the first model 132(1). For instance, if the first model 132(1) comprises an artificial neural network, then selecting the content-item title as output and providing information regarding the consumption history of the user as input may be effective to train one or more internal layers of the neural network. It is to be appreciated that the input and output of the neural network, and other types of models that may be used, may comprise features of the corresponding game titles or other content items, such as release data, genre, game-type, and/or the like.

In some instances, the training component 120 may take into account the amount of time that the user has consumed each content item in her history in selecting the title to be used as output for the machine-learning model 132(1). For example, the training component 120 may initially determine an amount of time that the user has consumed each individual title referenced in the consumption history of the user. This may be determined either absolutely (e.g., in terms of time) or relatively (e.g., in terms of time relative to other users that have also consumed the title). This information may be applied as a weight to the individual content-item title. After applying a weight to each title associated with the history or inputting this information to the models (after, potentially, filtering out some titles due to a very small amount of consumption by the user), the training component 120 may then select one (or more) content-item title to be used as output by the first model 132(1). By doing so, the training component 120 increases the chances that the content items consumed the most by the user are selected as the output of the first model 132(1), thus training the internal layer(s) of the first model in a way that results in the model being more likely to select content items of interest to the user.

In addition to training a first model 132(1), in some instances the training component 120 may also train multiple other models, such as a model for recommending games released within the last year 132(2), a model for recommending games released within the last three years 132(3), and so forth. In each instance, the training component 120 may access a consumption history of a user and select, as the output to the particular model, a title that is both indicated in the history and that was released within the amount of time associated with the particular model (e.g., within one year, three years, etc.). Furthermore, while the above example describes accessing a single history for training each of the multiple machine-learning models, it is to be appreciated that the training component 120 may analyze thousands or more of the histories for training the models 132.

The correlation component 122, meanwhile, may function to generate correlation scores for individual users in response to receiving recommendation requests from these individual users. For example, as illustrated the client device 102 may include one or more processors 134 and computer-readable media 136, which may store or otherwise having access to one or more client applications 138 and an interpolation component 140. In some instances, a user of the client device 102 may utilize one of the client applications 138 (e.g., a browser, a dedicated application, etc.) to interact with the computing system 106, such as to request data for rendering the UI 110. In response to receiving this request, the correlation component may determine an identifier associated with a user of the client device 102 for generating score data that may be used to recommend one or more content items to the user.

In one example, the user correlation component 122 access, from the history data 130, a consumption history of the user of the client device 102 after identifying the user. The correlation component may then input this consumption history into each of the "N" trained models 132. The models 132 may each output score data indicating, for each of multiple content items associated with a time range corresponding to the individual model 132, a correlation between the content item and the consumption history of the user. As described above, a higher score may indicate a greater correlation. In some instances, each time range associated with a particular model is exclusive, such as in the example where a first model is associated with content items released within the last six months, a second model is associated with content items released between six and twelve months prior, and so forth. In other instances, the time ranges are not exclusive, as in the example where a first model is associated with content released within the last six months, a second model is associated with content items released within the last year (including the prior six months), and so forth.

The biasing component 124, meanwhile, may function to bias each of the "N" score data generated by the correlation component 122 according to "M" number of values of a particular parameter. This parameter may comprise a level of a popularity, a cost, a release date, or the like. In some instances, the parameter comprises a level of popularity, as indicated by the popularity data 126.

For example, the biasing component may determine, for each content item associated with each score data output by each model, whether to boost or penalize the individual score for "M" different values of the popularity. In one example, the biasing component 124 boosts or penalizes the score for each content item according to five different values of popularity, ranging from very popular to very unpopular (or, rather, very "niche"). After doing so, the biasing component may have generated a matrix or other representation of scores, one implementation of which is illustrated and described with reference to FIG. 3.

After the matrix or other representation of scores has been generated, the computing system 106 may send this "result data" back to the client device 102 that initially requested the recommendations. The interpolation component 140 may then determine an order in which to present recommended content items based at least in part on the received result data, as well as the values of the UI controls 112(1) and 112(2). For example, for any given set of values of these two controls, the interpolation component 140 may identify the nearest one or more score data from the result data and may interpolate scores for content items(s) based on the identified score data. The interpolation component 140 may employ bilinear interpolation and/or any other method of interpolation. Furthermore, as the user provides input via the UI control 112(1) and/or 112(2), the interpolation component 140 may perform a new interpolation and update the UI 110 to indicate the new recommendation(s).

Figure 2:
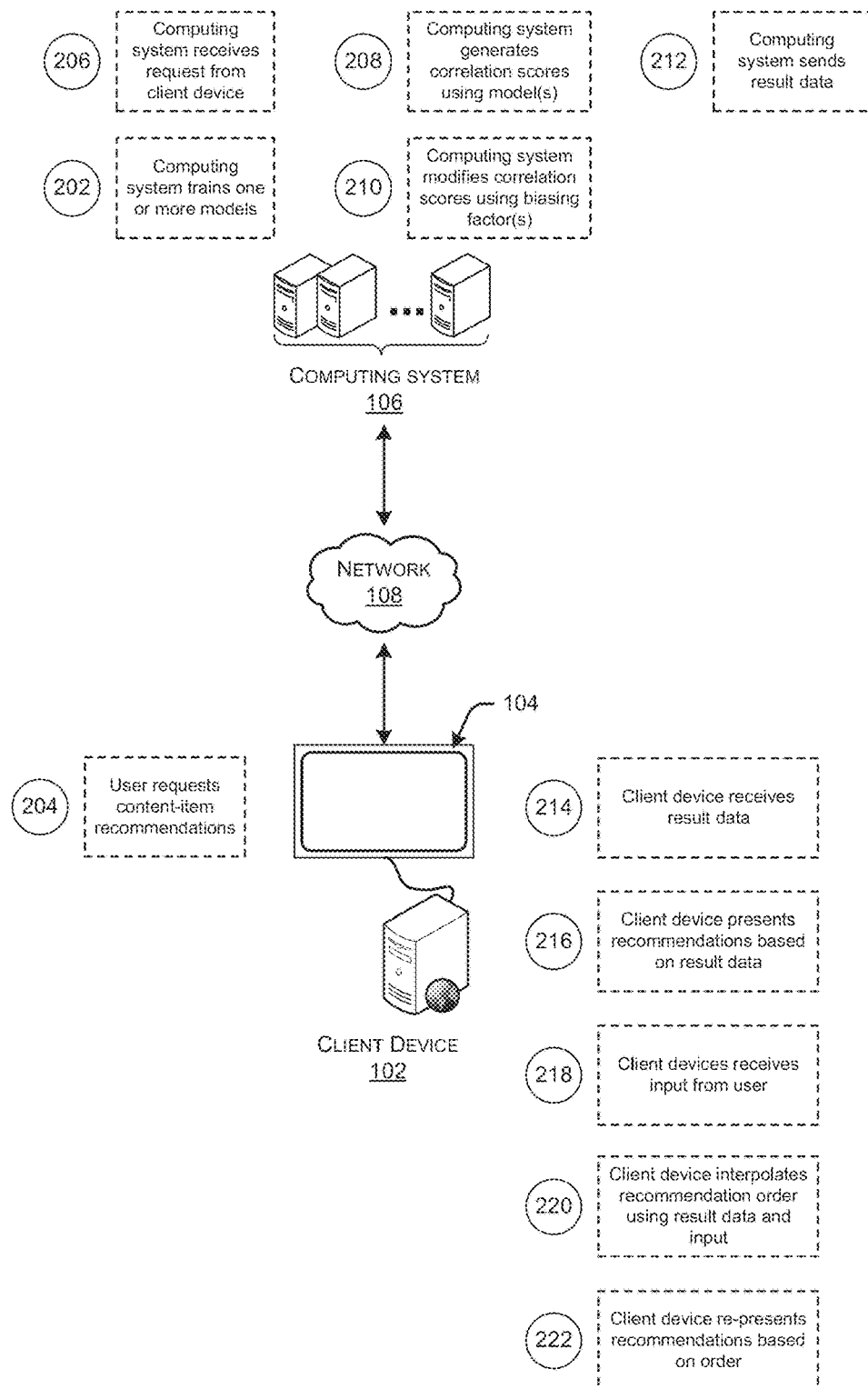
FIG. 2 illustrates an example process of operations for generating machine-learning models, applying them to history data of a particular user, sending generated result data to a client device of the user, and using this result data and received user input to determine order(s) in which to present content-item recommendations to the user.

FIG. 2 illustrates an example process 200 of operations for generating machine-learning models, applying them to history data of a particular user, sending generated result data to a client device of the user, and using this result data and received user input to determine order(s) in which to present content-item recommendations to the user. While this process 200 is described with reference to the environment 100 of FIG. 1, it may apply to other environments.

At an operation 202, the computing system 106 may train one or more machine-learning models using any of the techniques described above. In some instances, the operation 202 includes training "N" number of models, each associated with a particular value of a parameter, such as a particular time window during which a content item was released.

In one example, the computing system 106 may begin the training operation by accessing respective consumption histories (e.g., gameplay histories, moving histories, etc.) of multiple users associated with the computing-system community. For example, the computing system may access a gameplay history of a first user of a video-game-service community and may use this history for training the first model. For example, if the first model is for use in recommending game titles that have been released within the past six months, the computing system may select, from the gameplay history of the user, one game title that has been released within the past six months and may indicate to the first model that this selected game title is to be the output of the classifier. That is, the computing system 106 may identify a game title or other content item having the value of the parameter for which the model is being trained.

Thereafter, the computing system 106 may provide the entire gameplay history of the user as input to the first model and the selected game title as output of the first model for training one or more internal layers of the first model. For instance, if the first model comprises an artificial neural network, then selecting the game title as output and providing information regarding the gameplay history of the user as input may be effective to train one or more internal layers of the neural network. It is to be appreciated that the input and output of the neural network, and other types of models that may be used, may comprise features of the corresponding game titles or other content items, such as release data, genre, game-type, and/or the like.

In some instances, the computing system 106 may take into account the amount of time that the user has played each game in her history in selecting the game title to be used as output for the machine-learning model. For example, the computing system may initially determine an amount of time that the user has played each individual game title referenced in the gameplay history of the user. This may be determined either absolutely (e.g., in terms of time played) or relatively (e.g., in terms of time played relative to other users that have also played the game title). This information may be applied as a weight to the individual game title or inputted as information for the models. After applying a weight to each game title associated with the gameplay history or inputting this information to the models (after, potentially, filtering out some game titles due to a very small amount of gameplay by the user), the computing system may then select one (or more) game title to be used as output by the first model. By doing so, the computing system increases the chances that the games played the most by the user are selected as the output of the first model, thus training the internal layer(s) of the first model in a way that results in the model being more likely to select games of interest to the user.

In addition to training a first model, in some instances the computing device may also train multiple other models each associated with a different value of the parameter, such as a model for recommending games released within the last year, a model for recommending games released within the last three years, and so forth. In each instance, the computing system may access a gameplay or other consumption history of a user and select, as the output to the particular model, a game title that is both indicated in the gameplay history and that was released within the amount of time associated with the particular model (e.g., within one year, three years, etc.). Furthermore, while the above example describes accessing a single gameplay history for training each of the multiple machine-learning models, it is to be appreciated that the computing system may analyze thousands or more of the gameplay histories for training the models.

At an operation 204, the client device 102 receives a request from a user for one or more content-item recommendations. This may include a user using the client device 102 to navigate to a site provided by the computing system 106, interacting with a dedicated application generated by the computing system 106, or the like.

At an operation 206, the computing system 106 receives the request and, at an operation 208, generates a set of "N"

correlation scores using the "N" trained models. As described above, this may include identifying a consumption history of the requesting user and inputting the consumption history into each of the "N" trained models to receives "N" sets of correlation scores.

At an operation 210, the computing system 106 modifies each score within the "N" sets of correlation scores using one or more biasing factors. For example, for each biasing factor, the computing system 106 may use "M" number of values of the biasing factor to generate M×N number of sets of now-biased correlation scores. Of course, if multiple biasing factors are used, then a greater number of sets may be generated. For example, if two biasing factors are used, then the computing system 106 may generate M×M×N number of biased scores. As described above, in some instances, the biasing factor may correspond to a level of popularity of each content item. Further, it is also to be appreciated that the computing system 106 may generate the correlation scores and the biased correlation scores nonlinearly. Further, any number of values may be computed.

At an operation 212, the computing system sends this "result data" to the client device 102, which receives the result data at an operation 214. At an operation 216, the client device 102 presents one or more content-item recommendations to the user based on the received result data. In some instances, the initial recommendations may be based on the current setting of the values of any parameters having values that may be set by the user.

At an operation 218, the client device 102 receives input from the user. This may include altering a value of one or more parameters, such as a desired release data, a desired popularity level, or the like. At an operation 220, the client device 102 using the input data and the result data to interpolate scores for the content items. That is, the client device 102 generates a recommendation order using the result data and the received input. Finally, at an operation 222, the client device 102 may re-present the recommendations, albeit in the newly computed order.

Figure 3:
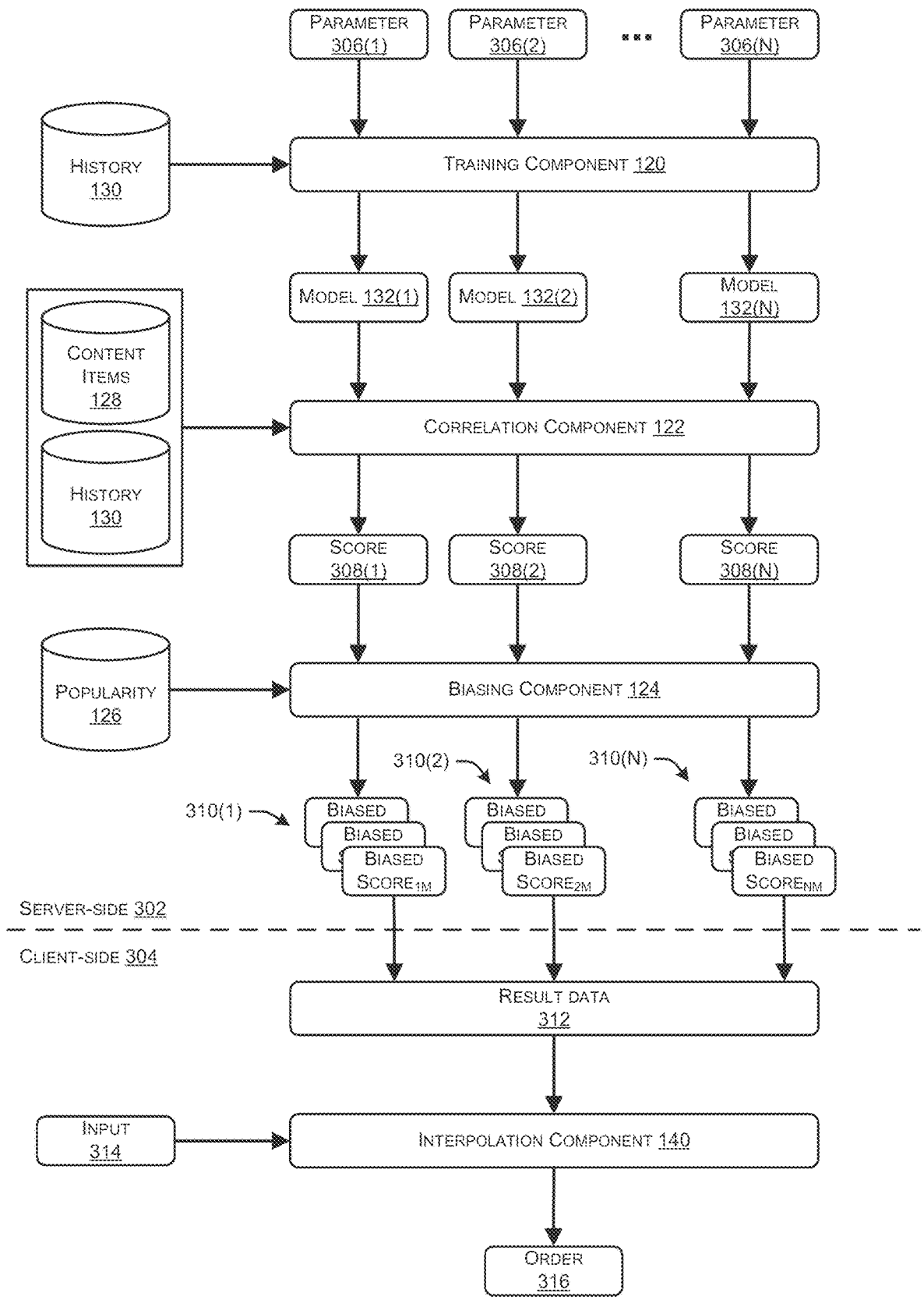
FIG. 3 illustrates example components, and interplay thereof, for generating the models, biasing the resulting scores, applying the models to history data of a particular user, and using this result data and received user input to determine order(s) in which to present content-item recommendations to the user.

FIG. 3 illustrates example components, and interplay thereof, for generating the models, biasing the resulting scores, applying the models to history data of a particular user, and using this result data and received user input to determine order(s) in which to present content-item recommendations to the user. It is to be appreciated that while FIG. 3 illustrates one example set of components for performing the described techniques, other components may be used in other instances.

As illustrated, in this example some of the components reside on a server-side 302 and other component(s) reside on a client-side 104. For example, the components on the server-side 302 may reside on the computing system 106, while the component(s) on the client-side may reside on the client device 102.

To begin, history data 130 and one or parameters 306(1), 306(2), . . . , 306(N) may be input into the training component 120 for generating the respective models 132(1)-(N). That is, the training component 120 may receive an indication of particular values of the parameter for which the training component 120 is to train a model. For example, the parameter 306(1) may indicate a value of "release date within last six months", the parameter 306(2) may indicate a value of "release date within last year", and so forth. Of course, in other instances the parameters may correspond to a price of a content item, a popularity of a content item, and so forth. Furthermore, the history data 130 may comprise consumption history of a population of users as described above.

Also as described above, the training component 120 may input individual consumption histories into a respective machine-learning model for training the model. For example, for the model 132(1) having the parameter value of "release date within last six months", the training component may input individual consumption histories as input to the model and may designate, from each respective history, a content-item title having been released within the previous six months as output for the model 132(1). The training component 120 may then train one or more internal layers of this model 132(1) using this input and output. The training component 120 may perform this operation for an array of different consumption histories from the history data 130 and for each of the models 132(1)-(N). In addition, the input to the models 32 may include information associated with the user, such as a geographical location associated with the user, demographic information associated with the user, and/or the like. In addition, while a few example inputs to the models have been described, it is to be appreciated that any other type of input may be provided to the models.

After the models 132(1)-(N) have been trained, these models may be used for generating content-item recommendations for users. Upon receiving a request for recommendations from a particular user, a consumption history (stored in the history data 130) associated with the user may input into the correlation component 122, along with a library of available content items 128. The correlation component may input this data to each of the models 132(1)-(N), which may output respective correlation scores 308(1), 308(2), . . . , 308(N). For example, the model 132(1) may output recommendations for content-items that have been released within the last six month and that are tailored to the user based on the consumption history of the user, and so forth.

In some instances, these scores 308(1)-(N) may input into the biasing component 124, which may generate a set of biased scores 310(1), 310(2), . . . , 310(N) for each of the correlation scores 308(1)-(N). That is, the biasing component may select one or more values of a particular biasing factor and may boost or penalize the score of each content item within each of the scores 308(1)-(N) based on how well the content item corresponds to the respective value of the biasing factor. For example, the biasing factor may comprise a popularity of a content item, as indicated by the popularity data 126 which may be input into the biasing component. As described above, this popularity data 126 may comprise sales data, consumption time, or the like.

In one example, the biasing component select "M" number of values of the biasing factor, such as M values of popularity ranging from very popular (e.g., having a very high sales number) to very unpopular or niche (e.g., having a very low sales number). Thus, the biasing component 124 may boost the scores of very popular titles for the former value of the biasing factor and penalize very niche titles, and may do the opposite for the latter value of the biasing. In this example, the biasing component 124 may output a number of biased scores of "M×N" or any other number, given that the sampling may occur non-linearly. In some examples, the computing system 106 sends these biased scores 310(1)-(N) to the client device 102 associated with the user that initiated the request for the recommendations.

As illustrated, the sets of biased scores 310(1)-(N) may be provided as result data 312 to the client device 102. This result data 312 may be input into the interpolation component 140, potentially along with input data 314 generated in response to user input received at the client device 102. For example, the input data 314 may indicate a specific value of the parameter on which the models 132(1)-(N) and/or a specific value of the biasing factor on which the scores were biased. In response to receiving this input data 314, the interpolation component 140 may determine an order 316 in which to present the recommendations to the user. For example, upon receiving the input data 314, the interpolation component 140 may identify one or more nearest biased scores from the result data and may interpolate between these values if need be. For example, the interpolation component 140 may perform bilinear interpolation or any other type of interpolation for determining the order 316 in which to present the recommendations to the user. Furthermore, as different input data 314 is received (e.g., a different value of the parameter or biasing factor), the interpolation component 140 may re-interpolate the order 316 using the input data 314 and the result data 312 and may present the recommendations in the new order 316 to the user. Furthermore, and as described above, the interpolation component 140 may re-compute different orders using the result data 312 and the input data 314 without interacting with the computing system 106, thus enabling real-time resorting on the recommendations on the display of the client device 102.

Figure 4:
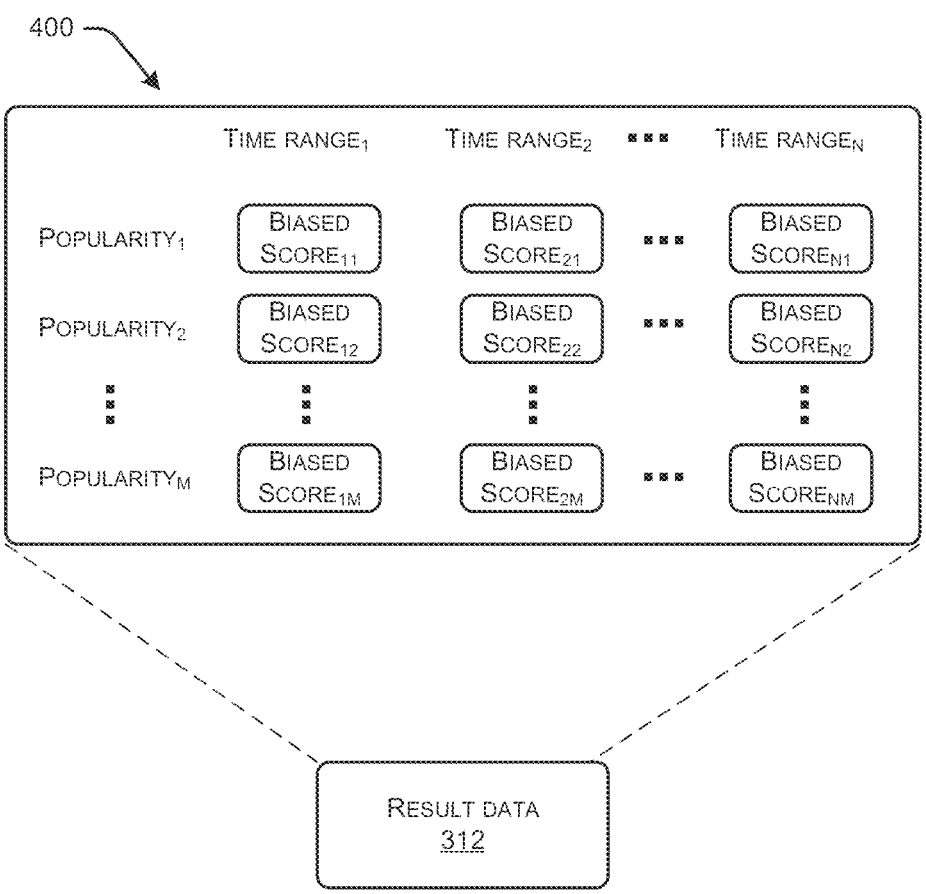
FIG. 4 illustrates example result data that the remote computing system may generate and send to a client device of a user. As illustrated, the result data may comprise an M×N matrix of scores, which the client device may interpolate between as needed in response to receiving varying user input.

FIG. 4 illustrates example result data 312 that the remote computing system 102 may generate and send to a client device 102 of a user. As illustrated, in this example the result data 312 may comprise an M×N matrix of scores, which the client device may interpolate between as needed in response to receiving varying user input. It is to be appreciated, however, that the result data may be sampled in any pattern in parameter space of any number of dimensions. For example, the matrix or other representation of scores may be sampled at different points other than the M×N points illustrated. For instance, the sampling may occur non-linearly. Further, the number of sampled points may vary (e.g., may be more less than M×N number of points). In addition, more than two parameters and/or biasing factors may be used, resulting in higher-dimensionality parameter spaces.

In this example, the result data 312 corresponds to a parameter of a time range in which a content item was released and a biasing factor corresponding to a popularity of a content item. Further, the training component 120 has trained "N" number of values of this parameter, as indicated by the result data having "N" number of values of the parameter (time ranges 1-N). In addition, the biasing component 124 may biased each score output by the correlation component 122 using "M" number of values of the biasing factor (popularity 1-M). Thus, in this example, the result data 312 comprises an M×N number of scores.

In response to a user providing an input changing a value of the parameter (time range) or a value of the biasing factor (popularity), the interpolation component may identify the nearest scores and may perform interpolation to computing interpolated scores, which may be used to determine an order in which to recommend content items to the user. For example, envision that a user operating the client device 102 requests to view recommendations for content items that have been released at a time between "time range 1" and "time range 2" and having a popularity that falls between "popularity 1" and "popularity 2". In response to receiving this input data, the interpolation component 140 may identify the four scores that are nearest this input, such as "biased score 11", "biased score 12", "biased score 21", and "biased score 22". The interpolation component may then use these scores to perform bilinear interpolation or any other type of suitable interpolation algorithm to generate an interpolated score. This score may then be used to determine an order in which to present the content-item recommendations to the user. For example, a highest-scoring content item may be presented first, a second-highest-scoring content item may be presented second, and so forth.

Figure 5:
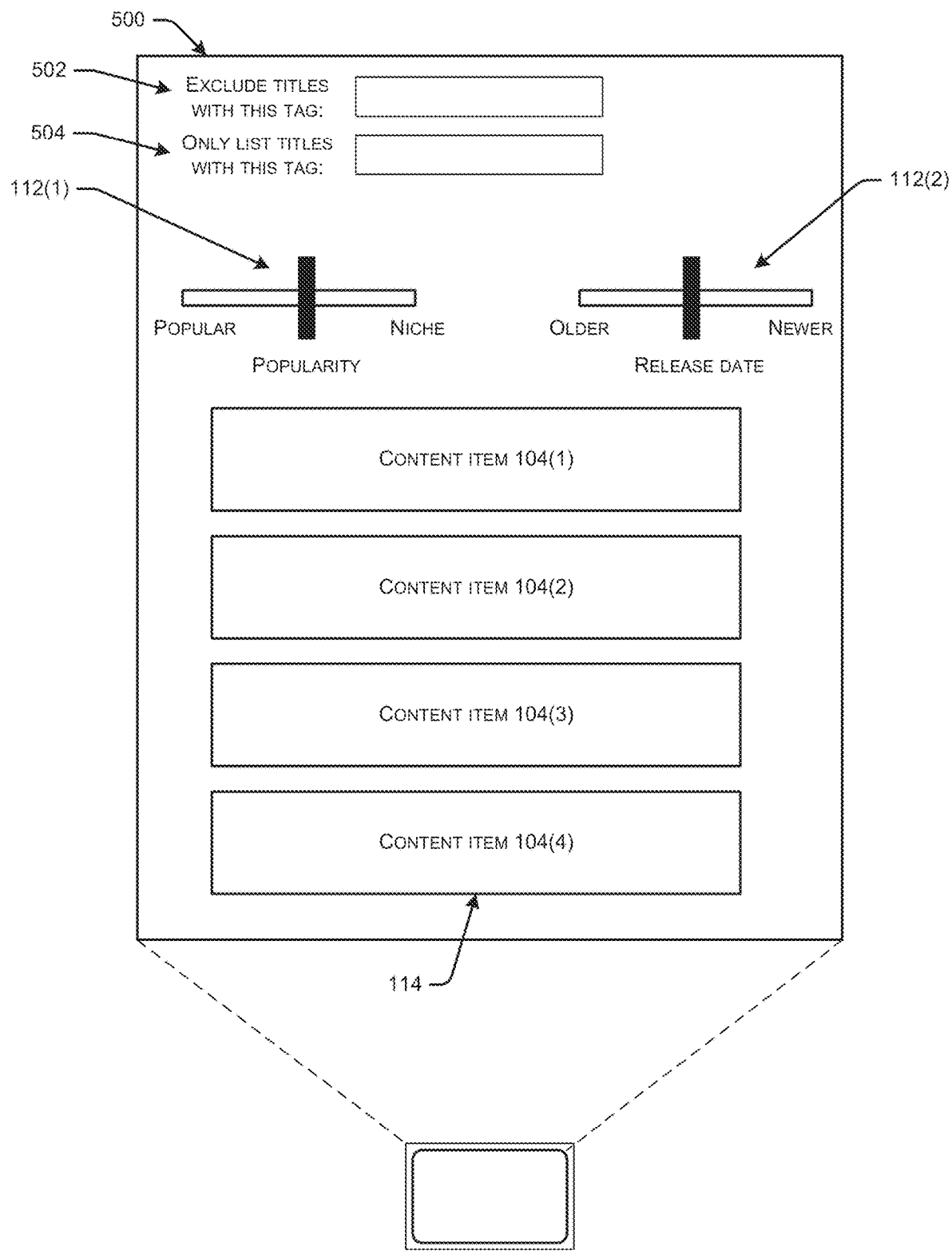
FIG. 5 illustrates an example user interface (UI) that a client device may present in response to receiving a request from a user for content-item recommendations.

FIG. 5 illustrates an example user interface (UI) 500 that a client device 102 may present in response to receiving a request from a user for content-item recommendations. As illustrated, the UI 500 may present the custom list 114 of recommended content items 114(1), 114(2), 114(3), and 114(4), with this list 114 being determined based on a consumption history of the user for which the UI 500 was generated and respective values of each of the UI controls 112(1) and 112(2). For example, the UI control 112(1) may comprise a slider or other type of UI control to enable the user to select a desired level of popularity, while the UI control 112(2) may comprise a slider or other type of UI control to enable the user to select a desired recency of the recommended content items. In some instances, the UI 500 presented to the user may comprise a default value for each of these UI controls 112(1), such as in the middle of each range, or the like. Thus, the scores for the content items and, hence, the list 114 may be generated based on these default values, which may be changed as discussed below with reference to FIG. 6.

In addition, the UI 500 may include a UI control 502 in which a user may request to filter out games having a user-designated tag, as well as a UI control 504 in which a user may request to filter out games not having a user-designated tag. In this example, for instance, the user may type in or select via a drop-down menu a tag in either of the controls 502 or 504. In response to receiving a tag in the UI control 502, the client device 102 may change the list 114 by removing any content items associated with the designated tag. In response to receiving a tag in the UI control 504, meanwhile, the client device 102 may change the list 114 by removing any content items that are not associated with the designated tag.

Figure 6:
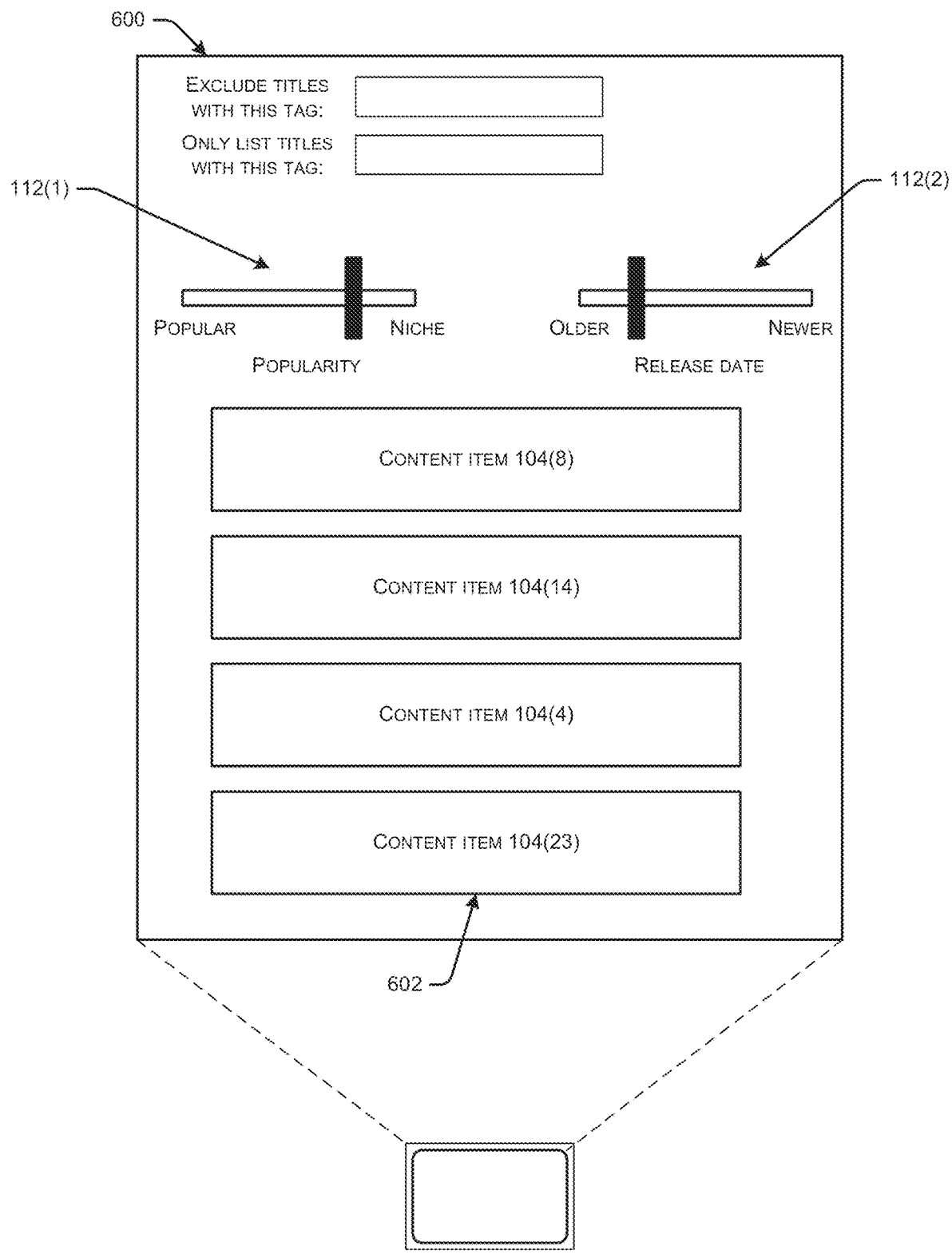
FIG. 6 illustrates an example UI that the client device may present in response to the user altering a value of a first parameter (in this example, popularity of the content items) and a value of a second parameter (in this example, recency of the content items).

FIG. 6 illustrates an example UI 600 that the client device 102 may present in response to the user altering a value of a first parameter (in this example, popularity of the content items) and a value of a second parameter (in this example, recency of the content items). For instance, in this example the user of the client device has moved the slider on the left side of the UI further to the right (e.g., to request content items that are less popular) while moving the slider on the right side of the UI to the left (e.g., to request content items that are relatively older. Thus, in response, the interpolation component 114 may computed a new list 602 of content items corresponding to these user inputs. For example, the list 602 may include content items that were released within a relatively large time range and that are not overly popular.

Figure 7:
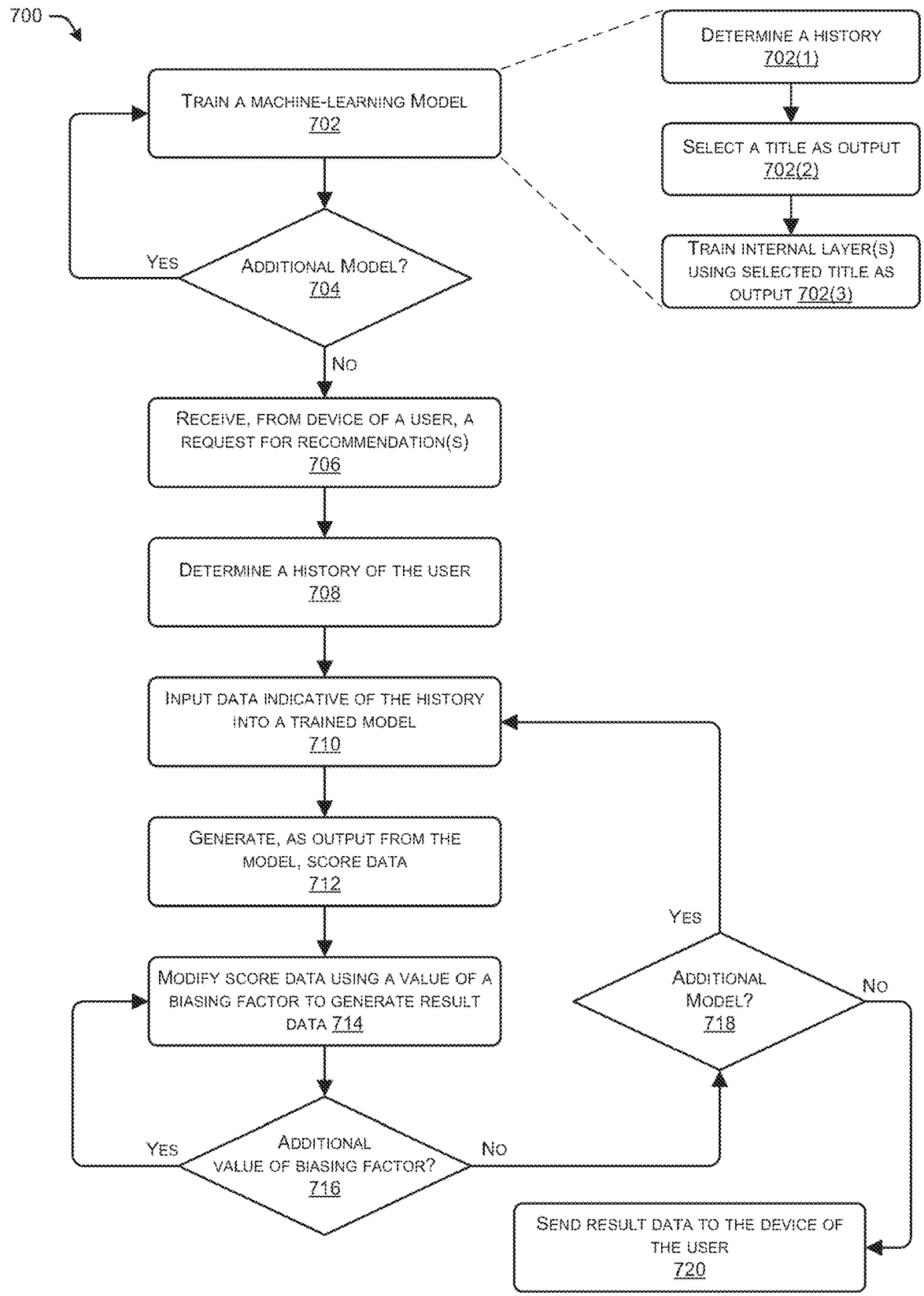
FIG. 7 illustrates a flow diagram of an example process that the remote computing system may employ for generating one or more trained machine-learning models and generating result data for use by a client device in providing content-item recommendations to a user.

FIG. 7 illustrates a flow diagram of an example process 700 that the remote computing system may employ for generating one or more trained machine-learning models and generating result data for use by a client device in providing content-item recommendations to a user. This process, and each process described herein, is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

In some instances, the computing system 106 may be configured to perform some or all of the operations, although in other instances other devices may additionally or alternatively perform some or all of the operations.

At an operation 702, the computing system 106 may train a machine-learning model. As illustrated, this operation may comprise a series of sub-operations. For example, training the model may include, at a sub-operation 702(1), determining a consumption history of one or more users. As described above, this could include a gameplay history, a consumption history of movies or music, and/or the like. A sub-operation 702(2), meanwhile, may comprise selecting a title from each of the histories as output for the model that is to be trained. In some instances, this selection may be made: (1) from those content items in the history that meet the value of the parameter associated with the model currently being trained, and (2) with reference to how much each content item was consumed by the user. For example, the computing system 106 may apply a larger weight to those content items consumed by the respective user more greatly, thus increasing the likelihood that these content items will be selected as output. Finally, at a sub-operation 702(3), the computing system 106 may train one or more internal layers of the model using each consumption history as input and each selected title as output. These sub-operations may be performed serially for each of multiple consumption histories.

At an operation 704, the process 700 determines whether there is an additional model to be trained. For example, if the process 700 is train "N" number of models, the operation 704 represents determining whether any of the N models are still to be trained. If so, then the process 700 returns to the operation 702. If not, then the process 700 proceeds to an operation 706. At the operation 706, the computing system 106 may receive, from a client device of a user, a request for content-item recommendations. At an operation 708, the computing system 106 determines a consumption history of the user and, at an operation 710 inputs this history into a trained model.

At an operation 712, the computing system 106 generates, as output from the trained model, score data indicating a correlation between the consumption history of the user and each respective content item. In some instances, a relatively higher score corresponds to a relatively higher level of correlation. At an operation 714, the computing system 106 modifies each score of the score data based on a particular value of a basing factor, as described above. An operation 716 represents determining whether an additional value of a biasing factor is to be used to biased the scores. For example, if the computing system 106 is to bias the score data using "M" number of values of the biasing factor, then the operation 716 represents determining whether any of the "M" values are still to be used to bias the scores. If so, then the process 700 returns to the operation 714 for a new value of the biasing factor.

If not, then the process 700 proceeds to an operation 718, which represents determining whether an additional model is to be used to generate score data for the user. For example, if the computing system 106 is configured to use "N" number of models for generating score data that is tailored to the user, then the operation 718 represents determining whether any of the "N" models are still to be used to generate the score data for the user. If so, then the process 700 returns inputting the history data of the user into the next model at the operation 710. If not, then the process 700 proceeds to send the result data (e.g., the matrix or other representation of biased score data) to the client device for enabling the presentation of recommendations to the user.

Figure 8:
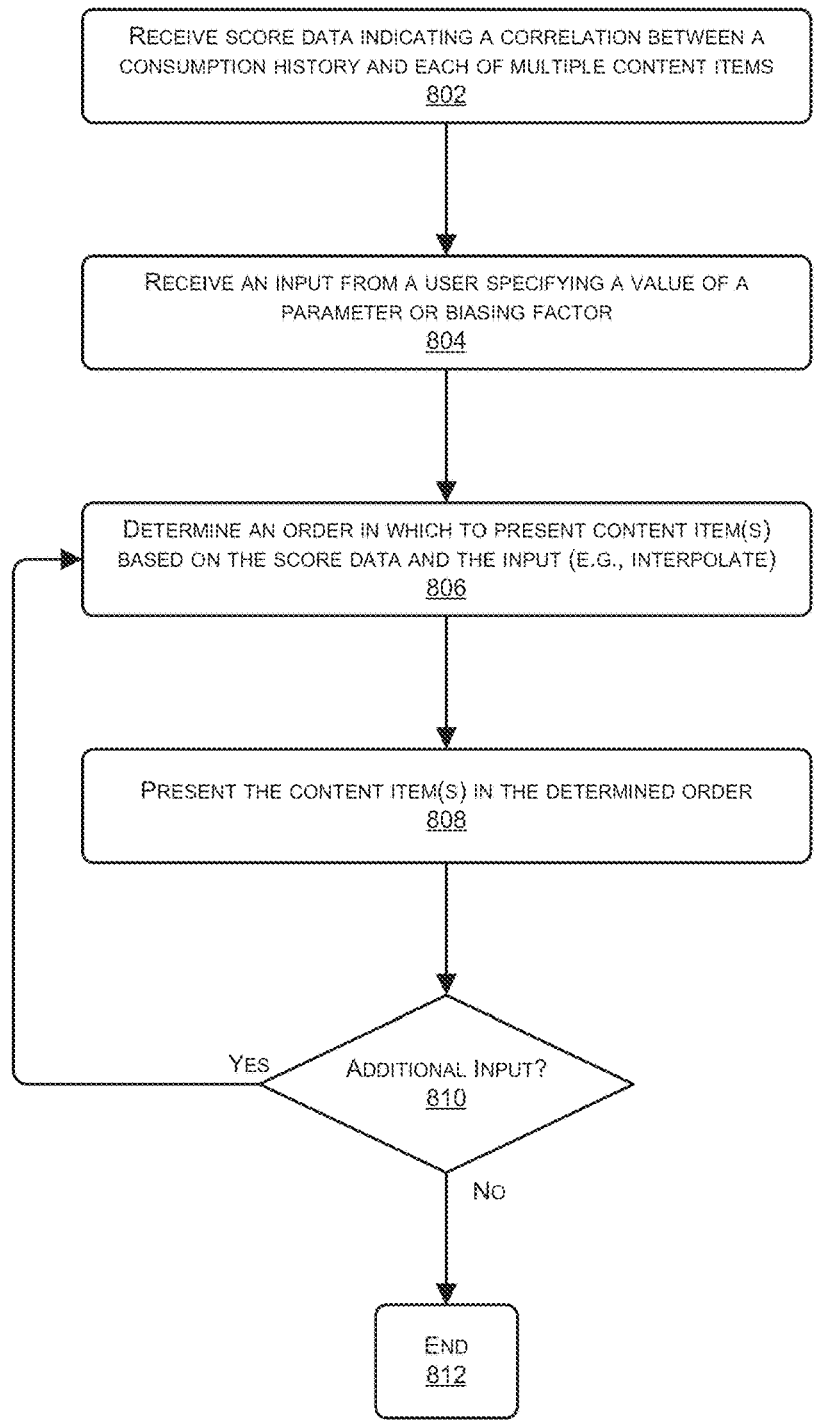
FIG. 8 illustrates a flow diagram of an example process that a client device of a user may employ for determining an order in which to present one or more content items to the user.

FIG. 8 illustrates a flow diagram of an example process 800 that a client device of a user may employ for determining an order in which to present one or more content items to the user. While this process 800 is described as being performed on the client device 102, it is to be appreciated that the process 800 may be additionally or alternatively be performed on other devices.

At an operation 802, the client device 102 receives score data indicating a correlation between consumption history of the user of the client device each of multiple content items. In some instances, the score data may comprise the result data 312 discussed above. At an operation 804, the client device 102 receives an input from the user specifying at least one of a value of a parameter on which the model was trained or a value of the biasing factor on which the score data was biased. For example, the input may specify a desired recency of the content-items to be recommended (e.g., a time range associated with their respective release dates), a desire cost range of the content items, a desired popularity level of the content items, and/or the like. At an operation 806, the client device 102 determines an order in which to present the recommended content items based at least in part on the score data and the received input. For example, the client device 102 may perform interpolation on the score data based on the value of the parameter and/or biasing factor specified by the user.

At an operation 808, the client device 102 presents the content-item recommendations in the determined order and, at an operation 810, determines whether an additional input is received from the user. If so, then the process 800 proceeds to again determine an order in which to (re-) present the content-item recommendations to the user based on the input. If not, then the process 800 ends at an operation 812.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A method comprising:
  determining, by a computing system, a history of one or more game titles played by a user;
  inputting, by the computing system and into a first trained machine-learning model, data indicative of the history;
  generating, as output from the first trained machine-learning model, first score data indicating, for each of multiple first game titles, a score representing a correlation between the history and the respective first game title;
  inputting, by the computing system and into a second trained machine-learning model, the data indicative of the history;
  generating, as output from the second trained machine-learning model, second score data indicating, for each of multiple second game titles, a score representing a correlation between the history and the respective second game title;
  sending, by the computing system and to a client device, result data that is based at least in part on the first score data and the second score data;

receiving, at the client device, the result data;
receiving first input data at the client device specifying a first time;
determining a first order of game titles to present on a display associated with the client device based at least in part on the result data and the first time;
presenting the first order of game titles on the display;
receiving second input data at the client device specifying a second time;
determining a second order of game titles to present on the display based at least in part on the result data and the second time; and
presenting the second order of game titles on the display.

2. The method as recited in claim 1, further comprising:
determining, for each of the multiple first game titles, a level of popularity of the respective first game title;
modifying, based at least in part on the respective levels of popularity of the multiple first game titles and a first specified popularity level, the first score data to generate third score data;
modifying, based at least in part on the respective levels of popularity of the multiple first game titles and a second specified popularity level, the first score data to generate fourth score data;
determining, for each of the multiple second game titles, a level of popularity of the respective second game title;
modifying, based at least in part on the respective levels of popularity of the multiple second game titles and the first specified popularity level, the second score data to generate fifth score data; and
modifying, based at least in part on the respective levels of popularity of the multiple second game titles and the second specified popularity level, the second score data to generate sixth score data;
and wherein the result data comprises the third score data, the fourth score data, the fifth score data, and the sixth score data.

3. The method as recited in claim 1, wherein:
each of the multiple first game titles was released within a first window of time;
each of the multiple second game titles was released within a second window of time; and
the first window of time comprises a first time period prior to a current time and the second window of time comprises a second time period prior to the current time, the second time period including and being greater than the first time period.

4. The method as recited in claim 1, wherein each of the multiple first game titles was released within a first window of time, each of the multiple second game titles was released within a second window of time, the user comprises a first user, and the method further comprises training a first machine-learning model to generate the first trained machine-learning model, the training comprising:
determining, by the computing system, a history of one or more game titles played by a second user;
selecting, by the computing system, a game title of the one or more game titles played by the second user, the selected game title having been released within the first window of time; and
training one or more internal layers of the first machine-learning model using the one or more game titles played by the second user as input to the first machine-learning model and the selected game title as output of the first machine-learning model.

5. The method as recited in claim 4, wherein each of the multiple first game titles was released within a first window of time, each of the multiple second game titles was released within a second window of time, and further comprising training a second machine-learning model to generate the second trained machine-learning model, the training comprising:
determining, by the computing system, a history of one or more game titles played by a third user;
selecting, by the computing system, a game title of the one or more game titles played by the third user, the selected game title of the one or more game titles played by the third user having been released within the second window of time; and
training one or more internal layers of the second machine-learning model using the one or more game titles played by the third user as input to the second machine-learning model and the selected game title of the one or more game titles played by the third user as output of the second machine-learning model.

6. A method comprising:
determining, by a computing system, a history of one or more content items consumed by a user;
inputting, by the computing system and into a first trained machine-learning model, data indicative of the history;
generating, as output from the first trained machine-learning model, first score data indicating, for each of multiple first content items, a score representing a correlation between the history and the respective first content item;
inputting, by the computing system and into a second trained machine-learning model, the data indicative of the history;
generating, as output from the second trained machine-learning model, second score data indicating, for each of multiple second content items, a score representing a correlation between the history and the respective second content item;
sending, by the computing system and to a client device, the first score data and the second score data;
receiving, at the client device, the first score data and the second score data;
receiving first input data at the client device specifying a first time;
determining a first order of one or more content items to present on a display associated with the client device based at least in part on the first score data, the second score data, and the first time;
presenting, on the display, the first order of one or more content items;
receiving second input data at the client device specifying a second time;
determining a second order of one or more content items to present on the display based at least in part on the first score data, the second score data, and the second time; and
presenting, on the display, the second order of one or more content items.

7. The method as recited in claim 6, wherein the determining the first order comprises:
generating third score data using interpolation of at least the first score data and the second score data;
and wherein the first order is based at least in part on the third score data.

8. The method as recited in claim 6, wherein:
the first score data is further based at least in part on a respective level of popularity of each content item of the multiple first content items; and
the second score data is further based at least in part on a respective level of popularity of each content item of the multiple second content items.

9. The method as recited in claim 6, wherein the first score data has been biased based at least in part on: (1) a first target level of popularity, and (2) a level of popularity of each respective first content item, and further comprising:
receiving, at the client device, third score data indicating, for each of the multiple first content items released within the first window of time, a correlation between the consumption history of the user and the respective first content item, wherein the third score data has been biased based at least in part on: (1) a second target level of popularity, and (2) the level of popularity of each of respective first content item.

10. The method as recited in claim 9, wherein:
the first input data further specifies a desired level of popularity; and
the determining of the first order is further based at least in part on the third score data and the specified desired level of popularity.

11. The method as recited in claim 10, further comprising:
generating fourth score data using interpolation of at least the first score data, the second score data, and the third score data;
and wherein the first order is based at least in part on the fourth score data.

12. The method as recited in claim 6, wherein each of the multiple first content items was released within a first window of time, each of the multiple second content items was released within a second window of time, the first window of time comprises a first time period prior to a current time and the second window of time comprises a second time period prior to the current time, the second time period including and being greater than the first time period.

13. A method comprising:
determining a history of one or more content items consumed by a user;
inputting, into a first trained machine-learning model, data indicative of the history;
generating, as output from the first trained machine-learning model, first score data indicating, for each of multiple first content items associated with a first value of a parameter, a score representing a correlation between the history and the respective first content item;
inputting, into a second trained machine-learning model, the data indicative of the history;
generating, as output from the second trained machine-learning model, second score data indicating, for each of multiple second content items associated with a second value of the parameter, a score representing a correlation between the history and the respective second content item;
sending, to a client device, the first score data and the second score data;
receiving, at the client device, the first score data and the second score data;
receiving a first input at the client device;
determining a first order of one or more content items to present on a display associated with the client device based at least in part on the first score data, the second score data, and the first input;
presenting, on the display, the first order of one or more content items;
receiving a second input at the client device;
determining a second order of one or more content items to present on the display based at least in part on the first score data, the second score data, and the second input and
presenting, on the display, the second order of one or more content items.

14. The method as recited in claim 13, wherein the parameter comprises a release date of a respective content item, the first value comprises a first time range, and the second value comprises a second time range.

15. The method as recited in claim 13, wherein the parameter comprises a cost of a respective content item, the first value comprises a first cost range, and the second value comprises a second cost range.

16. The method as recited in claim 13, wherein the determining the first order comprises:
generating third score data using interpolation of at least the first score data and the second score data;
and wherein the first order is based at least in part on the third score data.

17. The method as recited in claim 13, wherein:
the first score data is further based at least in part on a respective level of popularity of each content item of the multiple first content items; and
the second score data is further based at least in part on a respective level of popularity of each content item of the multiple second content items.

18. The method as recited in claim 13, wherein the first score data has been biased based at least in part on: (1) a first target level of popularity, and (2) a level of popularity of each respective first content item, and further comprising:
receiving, at the client device, third score data indicating, for each of the multiple first content items associated with the first value of the parameter, a correlation between the consumption history of the user and the respective first content item, wherein the third score data has been biased based at least in part on: (1) a second target level of popularity, and (2) the level of popularity of each of respective first content item.

19. The method as recited in claim 18, wherein:
the first input further specifies a desired level of popularity; and
the determining of the first order is further based at least in part on the third score data and the specified desired level of popularity.

20. The method as recited in claim 19, further comprising:
generating fourth score data using interpolation of at least the first score data, the second score data, and the third score data;
and wherein the first order is based at least in part on the fourth score data.

* * * * *